Dec. 7, 1937.   J. O. HEINZE   2,101,024
HIGH SPEED TRANSPORTATION SYSTEM
Filed Nov. 17, 1933   2 Sheets-Sheet 1
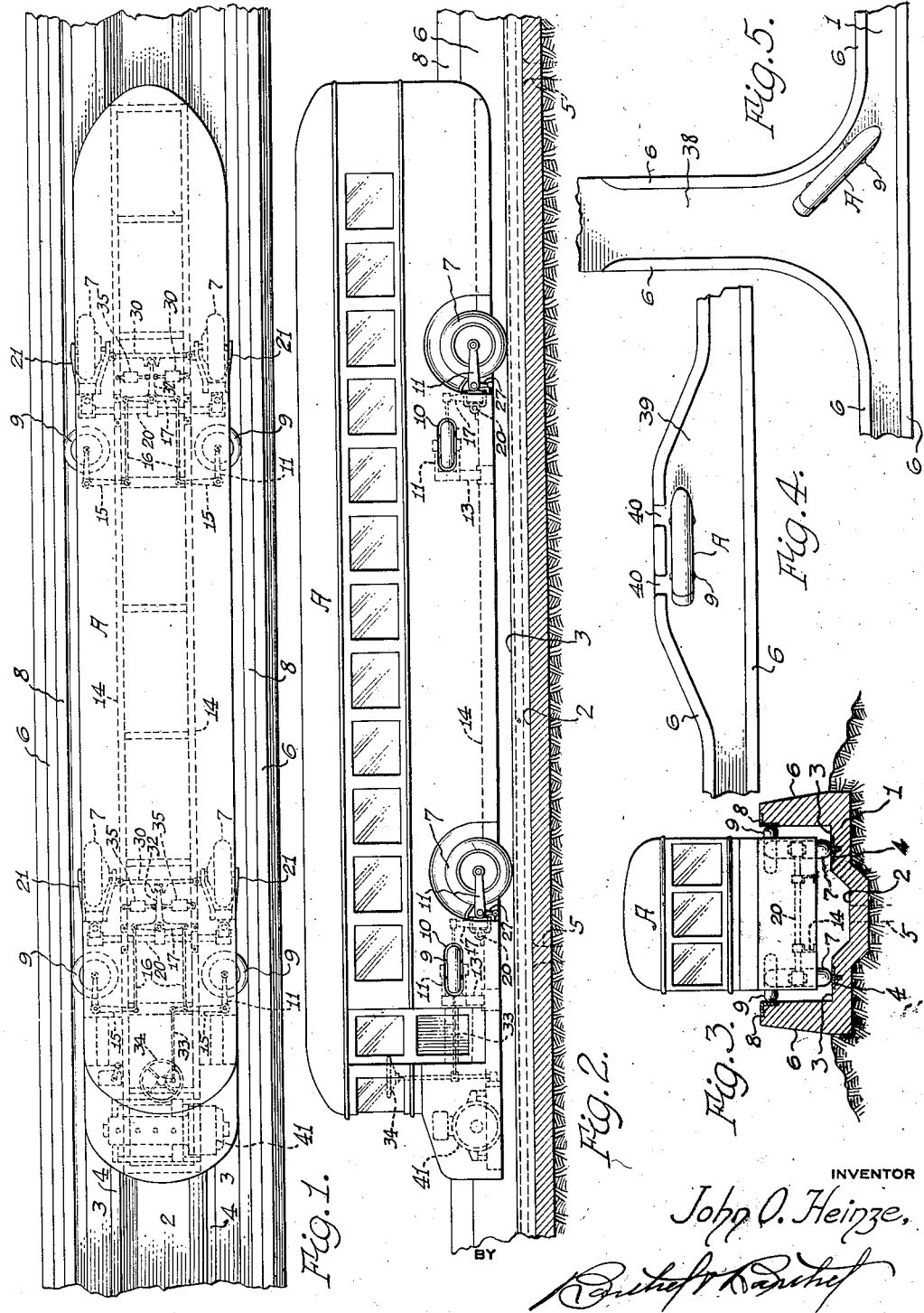
INVENTOR
John O. Heinze,
ATTORNEYS Dec. 7, 1937.    J. O. HEINZE    2,101,024
HIGH SPEED TRANSPORTATION SYSTEM
Filed Nov. 17, 1933    2 Sheets-Sheet 2
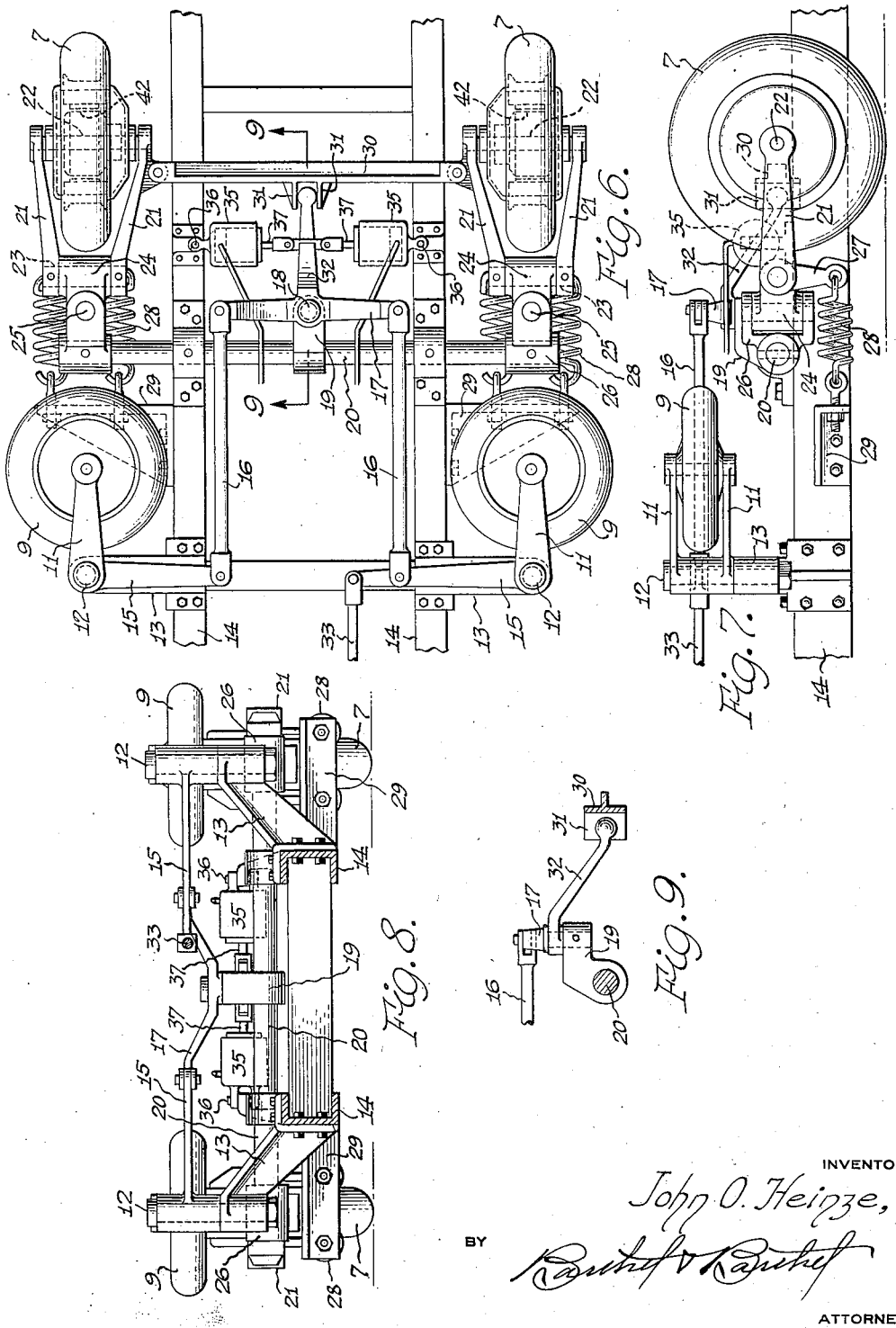

Patented Dec. 7, 1937

2,101,024

UNITED STATES PATENT OFFICE 2,101,024

HIGH SPEED TRANSPORTATION SYSTEM

John O. Heinze, Detroit, Mich., assignor, by direct and mesne assignments, to Heinze Development Company, a corporation of Michigan Application November 17, 1933, Serial No. 698,392

4 Claims. (Cl. 104—247)

This invention relates to a high speed transportation system including a track or way of a particular construction and a car or other vehicle especially adapted for travel along such way.

The trend of modern transportation is toward higher speeds, as indicated by the rapid development of the airplane, motor car, motor bus, motor truck, etc., but in each and every one of these, the element of maximum safety is lacking. Air travel is notoriously hazardous, and is handicapped by fixed landing requirements, and land travel over public roads is becoming more and more congested, increasing the hazard of travel and slowing it down. Railroads have their own right of way, but their equipment is too cumbersome and heavy for attaining high speeds with safety, and the cost of maintenance and operation is so great that they cannot compete with the motor truck or motor bus, particularly for short hauls.

High speed equipment of different kinds has been proposed for use by railroads upon their present or similar tracks and including individual units equipped with rubber tired wheels, but the problem of safety at very high speeds has not been solved, for, to attain such speeds, the unit must be comparatively light in weight, thus increasing the hazard of its leaving the track at such speeds.

The motor car or motor bus running upon the highways and equipped with rubber tires, has the advantage that it may be diverted from its route to pick up freight or passengers at any point within the several towns along said route, but such vehicles cannot be operated with safety at very high speeds over public highways, due to the nature of these highways and traffic congestion.

An object of the present invention is to provide a ground transportation system in which very high speed may be attained with safety.

A further object is to provide a system including a track or way having means for automatically guiding without manual attention, cars or other units while proceeding therealong at very high speeds, and for preventing the same from leaving the way during such high speed travel, each unit being equipped with means to bear against such guiding means and prevent excessive side sway of the unit.

It is also an object to provide a transportation system including cars equipped with rubber tired or other ground wheels, a motor and steering means, whereby each unit may be driven in a manner similar to that of the ordinary motor vehicle and where desired, after leaving the track or way of the system through side diverting ways or openings provided at points along the main way.

A further object is to provide, in a system including a way having side guide members and cars to run in said way, guiding and centering means on each car to run upon said side guide members of the way, and yieldingly hold the car centered therebetween and apply the side thrust of the car thereto; and further, to provide each car with automatically operating steering means to prevent drag which would otherwise be caused by side thrust against said guide members of the way.

It is also an object to provide certain other new and useful features in the construction, arrangement and combination, in a high speed transportation system, of a way and units to travel therein; all as hereinafter described and more particularly pointed out in the appended claims, reference being had to the accompanying drawings wherein—

Figure 1 is a plan view of a track or way and of a car in running position therein, illustrative of an embodiment of the present invention;

Fig. 2 is a central longitudinal section of the way with the car shown therein in side elevation;

Fig. 3 is a transverse section of the way with the car shown therein in end elevation;

Fig. 4 is a diagrammatic view illustrating a portion of the way in plan view;

Fig. 5 is a similar view of another portion of the way illustrative of a branch or outlet therefor;

Fig. 6 is a detail showing in plan view, a unit of the running and steering gear of the car;

Fig. 7 is a side elevation of Fig. 6;

Fig. 8 is a front end elevation of Fig. 6; and

Fig. 9 is a sectional detail substantially upon the line 9—9 of Fig. 6.

The track or way within which a car or vehicle A of the character shown, is adapted to travel at very high speeds, comprises a concrete structure formed with a bed or base 1 provided preferably, with a central longitudinal channel 2 and tracks 3, one at each side of said channel, upon which the ground wheels of the car are adapted to travel, each track being substantially flat in cross section and consisting preferably of a T-iron 4 embedded in the concrete with the upper surface of the head of the T flush with the surface of the concrete of the track and forming a smooth surface upon which the car wheels travel. The channel 2 forms a gutter between the tracks to conduct away water, said gutter having suitable outlets 5 at intervals. Integral with the base 1 along the side edges thereof, are vertical guide walls 6, one at the outer side of each track and of a height to extend a considerable distance upwardly at each side of the car or cars running upon said tracks, preferably with upper edges of said walls well above the horizontal plane of the upper sides of the ground or load carrying wheels 7 of the car, and embedded in the concrete at the upper inner angle of each wall, is preferably an angle bar 8 with its vertical flange flush with the inner vertical face of the wall, these angle strips or bars thus forming tracks along the walls for horizontally disposed side thrust or guide wheels 9 mounted upon the car to turn upon vertical axes, said thrust or guide wheels being located, one adjacent and forwardly of each ground wheel 7 at each side of the car, to project beyond said sides through openings or recesses 10 in the side walls of the car and run upon said tracks 8 and center and guide the car between said guide walls 6.

As shown more in detail in Figs. 6 to 8 inclusive, each guide wheel 9 is mounted within a yoke 11, which yoke forms one arm of a bell crank lever pivotally supported to swing upon a vertical pivot pin 12 mounted upon a bracket 13 secured to the side channel member 14 of the chassis frame of the car, and the other arm 15 of which bell crank extends inwardly from said pivot with a link 16 connecting it to one end of an equalizing bar 17 pivotally supported at 18 intermediate its ends upon a bracket 19 secured to a transverse shaft or fixed load carrying axle 20 fixed in bearings on said frame.

The load or ground wheels 7 of each truck or assembly, one of which assemblies is shown in Figs. 6, 7, 8, the assembly at the forward end of the car being substantially the same as that at the rear end, are each mounted for lateral swinging movement in steering the car and for independent vertical load supporting movement, by each wheel being mounted between a pair of side arms 21, the rear ends of which arms are provided with bearings for a short shaft 22 upon which the wheel is mounted, and the forward ends of these arms are secured to the ends of a short horizontal shaft 23 mounted in a bearing member 24 which member in turn is mounted for lateral swinging movement upon a vertical pin 25 passing through the arms of a yoke 26 having a hub to receive the end of the axle shaft 20 to which it is rigidly secured. Extending downwardly from the forward ends of the arms 21, which ends of said arms are pivotally supported at 23, and rigidly secured to said arms, are short arms 27 to the lower ends of which, coiled springs 28 are connected at one end, their opposite ends of said springs being connected to a bracket 29 secured to and projecting laterally from the side of each frame member 14. Upward movement of each wheel 7 about its pivot 23 under load, is thus resisted by said springs 28 and the load is thus yieldingly carried, and as the arms 21 between which each wheel is mounted, are supported for horizontal swinging movement upon the vertical pin 25, these wheels may be swung laterally to steer the vehicle by connecting the inside arms 21 for each pair of wheels by a connecting bar 30 having a pair of spaced apart ears 31 at its forward side to receive between them, the rear end of an arm 32 formed integral with or secured to the equalizing bar 17 and extending rearwardly from the point of pivotal support 18 of said equalizer.

With the car traveling at high speed between the guide walls 6 of the way, lateral swaying motion of the car will be resisted by the guide wheels 9 running in contact with the guide tracks 8 on said walls, and upon heavy side thrust of the car in one direction, the guide wheel or wheels 9 at that side will be forced inwardly, turning the bell crank upon which said wheel is mounted and through the connection of said crank by means of the link or rod 16 with the equalizer 17, swing the arm 32 of said equalizer toward the thrust side of the car, which movement of said arm will, through its connection with the connecting bar 30, swing both wheels 7 toward the thrust side, positioning them at an angle to the forward line of travel of the car which is such as to tend to steer that end of the car away from that guide wall of the way which is at that time taking the side thrust of the car, thus automatically steering the car away from that wall and keeping it in a mid position between said guide walls.

By connecting a rod 33 to the free end of the arm 15 of one of the bell cranks supporting one of the guide wheels 9 of one of the truck assemblies carrying two of the ground wheels, and connecting the forward end of this rod with any suitable hand steering mechanism operated by a hand wheel indicated at 34 in Figs. 1 and 2, the car may be steered by hand; and by providing a pair of air cylinders 35, one at each side of the arm 32 and pivotally attached at 36 to the frame members 14 with a piston in each cylinder having a piston rod 37 pivotally attached to said arm intermediate its ends, by any suitable air supply under pressure with suitable hand operated control mechanism, not shown, the arm 32 may be swung by power in either direction to swing the pair of ground wheels of each truck unit, to steer the vehicle.

By means of the above described mechanism the car is automatically guided and steered within the way while traveling therein at high speeds, to prevent the sides of the car from contacting the guide walls of the way, the guide wheels 9 rolling in contact with said walls, and by providing means for steering the car independently of said guide walls, the car may be directed in its movements after leaving the main track or way through a lateral passage as indicated at 38 in Fig. 5, the guide wall 6 at one side of the main way being curved laterally to direct the car into this lateral outlet 38 and the wall 6 at the opposite side of this outlet passage being also curved to meet the like wall of the main way for directing the car back into said way through said lateral outlet, the car being steered either by hand or by power as described, in leaving or entering the main way, such directing of the car being assisted by keeping, by such steering, the car close to the guide wall of the outlet with the guide wheels 9 in contact therewith. Preferably the combined inlet and outlet 38 will be more than double the width of the main way to permit ingoing and outgoing cars to pass each other, and as illustrated in Fig. 4, one wall 6 of the main way may be curved outwardly to increase the width of the main way as at 39 so that one car may be diverted laterally to clear the main way so that another car may pass or so that said car may stop to take on or let off passengers without blocking the main way, suitable openings 40 being provided in the guide wall to give access to the car.

With this arrangement of way and cars equipped with steering mechanism and ground wheels suitable for travel upon ordinary highways, the cars may be diverted from the main way and drive about in the manner of an ordinary bus or truck to pick up passengers or freight in towns along the way, each car being equipped with any suitable power plant, such as an internal combustion or other engine indicated at 41 in Figs. 1 and 2, for furnishing power to drive the vehicle, such as for generating electricity or furnishing a supply of air under pressure for driving each individual ground wheel 7 through the medium of a suitable motor located in the hub of each wheel as indicated at 42 in Fig. 6. This system thus combines the advantages of mobility of the ordinary motor bus or truck with that of the railway, in that it includes a private right of way, and with that of the airplane, in that very high speeds may be attained in proceeding along the main way of the system; and has the further advantage of a maximum of safety, in that cars traveling at very high speeds approximating two hundred miles per hour, within said way can not leave the way, are at all times protected and automatically directed by the side walls of the way, and a very rigid, smooth and substantial way is provided which is not subject to the hazards of spreading rails or defects in the road bed, the solid concrete side walls of the way adding greatly to the substantial nature of the way, and the metal tracks for the car wheels being embedded in the solid concrete mass, affording a smooth even surface for the tracks upon which said wheels travel.

Obviously changes in the construction of the way, and in the construction, arrangement and combination of the several elements and form of each car or other vehicle particularly designed for travel along said way at high speeds, may be made within the scope of the appended claims without departing from the spirit of the invention, such changes being contemplated, and I do not, therefore, limit myself to the particular construction or arrangement shown.

Having thus fully described my invention, what I claim is:—

1. A high speed transportation system including a way having guide members extending along opposite sides thereof for guiding a motor vehicle in its travel along said way, said way having a lateral outlet to permit the driving of said vehicle from said way; and a motor vehicle to travel along said way, said vehicle having ground wheels for travel upon said way and upon the highways, steering mechanism for steering said vehicle independently of said guide members of said way, horizontally disposed guide wheels upon said vehicle for travel along said guide members of said way, pivotally supported bell cranks upon which said guide wheels are mounted, means upon which each of a pair of ground wheels is mounted, said means being connected to said vehicle for pivotal movement in steering the vehicle, means for pivotally mounting each of said wheels for vertically yielding movement under load independently of the other or others, springs to yieldingly resist independent vertical pivotal movement of said mounting means and means for operatively connecting said bell cranks upon which said guide wheels are mounted and said means upon which said ground wheels are mounted for deflecting said ground wheels from their normal path of travel to steer the vehicle away from the guide member of the way into contact with which one of the guide wheels is brought by a side thrust of the vehicle.

2. A motor vehicle for travel along a highway and also along a guideway having a track and guiding means extending along each side of said track, said vehicle including a chassis frame, wheel suspension levers pivotally connected to the frame for upward and lateral swinging movement, a ground wheel journalled in and carried by each of said levers, linkage means connecting said levers to turn together laterally and permit individual upward movement, spring means opposing both vertical and lateral pivotal movement of said levers with respect to said frame, a horizontally disposed wheel arranged on each side of said frame, pivoted mounting means for each horizontal wheel, and linkage including a lever connecting said mounting means with said first named linkage means, said last named wheels being adapted to contact the lateral guiding means of said way in which the vehicle is adapted to operate.

3. A motor vehicle for travel along a highway and along a way having a track and lateral guiding means at each side of said track, said vehicle including a chassis frame and wheel suspension levers pivotally connected to the frame for vertical and transverse swinging movement, a substantially vertical ground wheel journaled on and carried by the free end of each of said levers, linkage means pivotally connecting said levers to turn together laterally and for independent vertical movement, spring means opposing both vertical and lateral pivotal movement of said levers with respect to said frame, horizontally disposed wheels to engage said lateral guiding means, a bell crank for supporting each of said horizontal wheels upon one end of one arm thereof, a linkage connected to the other arm of each of said bell cranks, and lever means connecting each of said last named linkages to said linkage means connecting said levers upon which said ground wheels are mounted.

4. The construction as set forth in claim 3, together with means under manual control for operating said lever means.

JOHN O. HEINZE.